United States Patent Office 3,227,656
Patented Jan. 4, 1966

3,227,656
ELECTROLUMINESCENT PHOSPHOR CONTAINING MOISTURE ABSORBENTS
Dennis Clifford Jeffreys, Glossop, England, assignor, by mesne assignments, to International Business Machines Corporation, New York, N.Y., a corporation of New York
No Drawing. Filed Aug. 31, 1961, Ser. No. 135,141
Claims priority, application Great Britain, Sept. 8, 1960, 31,039/60
6 Claims. (Cl. 252—301.2)

This invention relates to electroluminescent devices and to methods of manufacturing such devices.

Electroluminescent panels usually comprise a layer of phosphor which, when acted on by a variable, e.g. alternating, electric field, gives out light. Unfortunately, however, in at least some of these panels, manufactured according to known methods, there is a tendency towards rapid deterioration of efficiency. The efficiency in terms of light output for a given voltage variation can decrease by a factor of 3 or 4 within just a few weeks. It is known that this deterioration is due to the presence of hydroxyl groups in the phosphor layer, for the effect of light or an electrical field, or both, in the presence of these hydroxyl groups is to considerably reduce the efficiency of the electroluminescence. The panels are commonly sealed with wax, to prevent the ingress of moisture, immediately after they are made, but it is difficult to remove all the hydroxyl groups before sealing. This is particularly so where the energising electrodes have been made by printed circuit techniques involving the use of aqueous solutions. Furthermore, due to such use of aqueous solutions, it is not possible to incorporate an ordinary water-absorbent material in the phosphor, since this material would of course quickly become saturated during the manufacturing process.

An object of this invention is to increase the length of time for which the efficiency of electroluminescent devices is maintained.

One feature of the invention is an electroluminescent device incorporating a slow-acting water-absorbent material in the phosphor layer.

Another feature of the invention is a method of manufacturing an electroluminescent device which comprises the steps of forming a transparent electrode pattern on one face of a transparent plate, depositing over said pattern a phosphor layer incorporating a small proportion, by weight of the phosphor, of a slow-acting water-absorbent material, forming on said phosphor layer a layer of insulating material of high dielectric constant, forming on said insulating layer a second electrode pattern, applying an insulating backing plate against said second electrode pattern, removing as much moisture as practical and sealing the device against the ingress of moisture.

By "water-absorbent" is meant that the material has a substantial affinity for hydroxyl groups.

By "slow-acting" is meant that the material has a substantial residual capacity for binding hydroxyl groups after the various processing treatments involved in the manufacture of the device have been carried out.

A suitable slow-acting water-absorbent material is the sterically hindered isocyanate 3:3':5:5' tetramethyl 4:4' di-isocyanate diphenylmethane, and there is reason to believe that other isocyanates, suitably sterically hindered, would also be suitable, for example:

3:3':5:5' tetrachloro 4:4' di-isocyanate diphenylmethane
3:3' ditertiary butyl 4:4' di-isocyanate diphenylmethane
3 methyl 4:4' di-isocyanate diphenylmethane
3:3':3":5:5':5" hexamethyl 4:4':4" tri-isocyanate triphenylmethane The quantity of the material to be employed is not critical and is to some extent within the discretion of the manufacturer. Clearly, sufficient must be employed to obtain the benefit of an extended term of the efficiency of electroluminescence. On the other hand, if an excessive quantity of the material be employed, there will be no corresponding improvement in the maintenance of efficiency, and the material may crystallise in the layer and cause the electroluminescence to be uneven over the area of the device. Thus for optimum efficiency in the use of materials only a small proportion of the water-absorbent material, relative to the phosphor content, need be employed. In practice, with the first-named isocyanate mentioned above, a satisfactory proportion is within the range of ¼% to 2% by weight of the phosphor.

One method of manufacturing an electroluminescent device according to the invention will now be described by way of example.

A transparent plate is selected for use as a support for the phosphor layer. This plate is preferably of best quality plate glass, selected to have a perfect surface. A transparent electrode pattern is formed on one face of the plate by evaporating a transparent layer of a bismuth oxide/gold mixture on to the plate and, if the pattern requires the removal of any part or parts of this layer, etching with potassium cyanide, using printed circuit technique. After washing, to remove all traces of etching solution, and drying, a suspension of phosphor in 1% high-viscosity nitro-cellulose dissolved in butyl acetate, and containing ¼% to 2% by weight of the phosphor of 3:3':5:5' tetramethyl 4:4' di-isocyanate diphenylmethane, is then spin-coated over the formed electrode pattern to form the phosphor layer. After the solvent has evaporated and a high-dielectric-constant insulating layer of melamine and alkyd resins filled with barium titanate is applied over the phosphor layer, using butyl alcohol as solvent, and the layer is baked to harden it and to remove from it any excess solvent. A second electrode pattern (for use in conjunction with the first electrode pattern in the energisation of the device) is then formed on this insulating layer by evaporating a layer of copper on to the insulating layer and, if the pattern requires the removal of any part or parts of this copper layer, etching with ferric chloride, using printed circuit technique. Due to the use of resins as binders in the phosphor and insulating layers, aqueous photo-resists must be used for this second printed circuit operation. The device thus far assembled, after washing to remove all traces of etching solution, is then warmed, preferably under vacuum for 24 hours, to remove as much moisture as practical, and an insulating backing plate, e.g. of glass, is applied against the exposed electrode pattern, after which the assembly is preferably sealed with wax to prevent the ingress of moisture.

Since suitable phosphor materials are well known and since the nature of the various steps in the procedure set out above will be clear to those skilled in the art, no further detailed description is considered necessary.

From the above description it is readily apparent that ordinary water-absorbent materials would become saturated during the manufacturing process due to the multitude of hydroxyl groups present, in the alcohol as well as in the aqueous solutions.

The electrode patterns employed may take any desired form. For example, in the simple case where it is merely required to provide a device which will emit light over a whole area (as in the common case of a surround for an electric light switch) the electrode pattern may comprise an uninterrupted conducting layer extending over the whole area that is required to luminesce. Another example, more complicated, is the case of an information storage matrix for a computer, in which each electrode pattern may comprise many, say a few hundred, closely spaced parallel lines of conducting material (the lines of one electrode pattern being disposed at 90° relative to the lines of the other electrode pattern), so that only a small discrete area of the phosphor layer will luminesce when one selected line of one electrode pattern and one selected line of the other electrode pattern are energised.

To obtain comparative results, four sealed electroluminescent devices were made and tested under conditions which were as nearly identical as possible, two of the devices being made in accordance with the method described above and the other two being made by the same method except that the sterically hindered isocyanate was omitted from the phosphor layer. In the table below, the left-hand column indicates the time for which the devices were energised. Initially (i.e. at 0 hours) the brightness of each device was adjusted to be 1 foot-lambert by altering the voltage on each device where necessary and then maintaining this voltage for the duration of the test. The voltages on each device were substantially similar. On that scale of brightness the figures in the other columns indicate the relative brightness after the number of hours given in the left-hand column, columns A1 and A2 relating to the devices which did not incorporate the isocyanate and columns B1 and B2 relating to the devices which did incorporate the isocyanate. The improvement resulting from the incorporation of the isocyanate is clear from the table.

| Hours | Unimproved Electroluminescent Devices | | Electroluminescent Devices according to Invention | | |
|---|---|---|---|---|---|
| | A1 | A2 | B1 | B2 | |
| 0 | 1 | 1 | 1 | 1 | |
| 400 | 1/5 | 1/10 | 1/2 | 1/2 | Relative Brightness. |
| 1,000 | 1/10 | 1/40 | 1/2 | 1/2 | |
| 10,000 | 1/100 | <1/100 | 1/4 | 1/4 | |

I claim:
1. An electroluminescent phosphor having incorporated therein, from about ¼% to 2% by weight of the phosphor, a slow acting water absorbent material selected from the group consisting of 3:3':5:5' tetramethyl 4:4' diisocyanate diphenylmethane, 3:3' di-tertiarybutyl 4:4' diisocyanate diphenylmethane, 3 methyl 4:4' diisocyanate diphenylmethane, 3:3':3'':5:5':5'' hexamethyl 4:4':4'' triisocyanate triphenylmethane, and 3:3':5:5' tetrachloro 4:4' diisocyanate diphenylmethane.

2. The phosphor as in claim 1 wherein the water absorbent material is 3:3':5:5' tetramethyl 4:4' diisocyanate diphenylmethane.

3. The phosphor as in claim 1 wherein the water absorbent material is 3:3':5:5' tetrachloro 4:4' diisocyanate diphenylmethane.

4. The phosphor as in claim 1 wherein the water absorbent material is 3:3' di-tertiary butyl 4:4' diisocyanate diphenylmethane.

5. The phosphor as in claim 1 wherein the water absorbent material is 3 methyl 4:4' 4 diisocyanate diphenylmethane.

6. The phosphor as in claim 1 wherein the water absorbent material is 3:3':3'':5:5':5'' hexamethyl, 4:4':4'' triisocyanate triphenylmethane.

References Cited by the Examiner
UNITED STATES PATENTS

| | | | |
|---|---|---|---|
| 2,524,733 | 10/1950 | Payne et al. | 252—301.3 |
| 2,729,666 | 1/1956 | Stallmann | 260—453 |
| 2,879,583 | 3/1959 | Booth et al. | 29—25.13 |
| 2,922,216 | 1/1960 | McIlvaine | 29—25.13 |
| 3,037,938 | 6/1962 | Amans | 252—301.3 |

OTHER REFERENCES

Rose et al.: The Condensed Chemical Dictionary Fifth Edition, Reinhold Pub. Corp., New York, 1956, page 385, "Diisocyanates" relied upon.

TOBIAS E. LEVOW, *Primary Examiner.*

GEORGE N. WESTBY, *Examiner.*